United States Patent
Fornara et al.

(10) Patent No.: US 7,249,585 B2
(45) Date of Patent: Jul. 31, 2007

(54) SWIRL SYSTEM INTAKE MANIFOLD FOR AN INTERNAL COMBUSTION ENGINE

(75) Inventors: Stefano Fornara, Modena (IT); Giampaolo Schiavina, Bologna (IT)

(73) Assignee: Magneti Marelli Powertrain S.p.A., Corbetta (IT)

( * ) Notice: Subject to any disclaimer, the term of this patent is extended or adjusted under 35 U.S.C. 154(b) by 0 days.

(21) Appl. No.: 11/542,513

(22) Filed: Oct. 2, 2006

(65) Prior Publication Data

US 2007/0079800 A1     Apr. 12, 2007

(30) Foreign Application Priority Data

Oct. 3, 2005   (EP) ................... 05425686

(51) Int. Cl.
   *F02B 31/00*   (2006.01)
   *F02B 31/06*   (2006.01)

(52) U.S. Cl. ..................... 123/308; 123/302

(58) Field of Classification Search .............. 123/399, 123/306, 308, 302, 301, 432, 184.21
See application file for complete search history.

(56) References Cited

U.S. PATENT DOCUMENTS

| | | | | |
|---|---|---|---|---|
| 3,885,003 A | * | 5/1975 | Kobayashi et al. | 261/23.2 |
| 4,519,350 A | * | 5/1985 | Oda et al. | 123/308 |
| 4,930,468 A | * | 6/1990 | Stockhausen | 123/188.14 |
| 5,186,139 A | * | 2/1993 | Matsura | 123/301 |
| 2006/0005809 A1 | * | 1/2006 | Kado et al. | 123/399 |

FOREIGN PATENT DOCUMENTS

| | | |
|---|---|---|
| DE | 1297426 B | 6/1969 |
| GB | 759111 A | 10/1956 |
| WO | WO 2004/065772 A1 | 8/2004 |

OTHER PUBLICATIONS

Patent Abstracts of Japan, JP 59070854A (Toyota Motor Corp.), Apr. 21, 1984.

* cited by examiner

*Primary Examiner*—Mahmoud Gimie
(74) *Attorney, Agent, or Firm*—Robert P. Lenart, Esq.; Pietragallo Bosick & Gordon, LLP

(57) ABSTRACT

An intake manifold with a swirl system for an internal combustion engine having a number of cylinders; the intake manifold has, for each cylinder, an intake conduit connecting the intake manifold to the cylinder and in turn having two parallel channels; the swirl system has, for each intake conduit, a throttle valve housed inside a channel of the intake conduit to vary the air flow section of the channel, and which has a throttle mounted to rotate about an axis of rotation.

11 Claims, 6 Drawing Sheets

SWIRL SYSTEM INTAKE MANIFOLD FOR AN INTERNAL COMBUSTION ENGINE

The present invention relates to a swirl system intake manifold for an internal combustion engine.

BACKGROUND OF THE INVENTION

An internal combustion engine has a number of cylinders, each connected to an intake manifold via at least one intake valve, and to an exhaust manifold via at least one exhaust valve. The intake manifold receives fresh air (i.e. outside air) along a feed conduit regulated by a throttle valve, and is connected to the cylinders by respective intake conduits, each regulated by at least one intake valve.

A swirl system has recently been proposed to vary the cross section of the intake conduits when the engine is running and as a function of engine speed (i.e. drive shaft rotation speed). At low engine speed, the air flow section of the intake conduits is reduced to produce swirl in the air intake to improve the air-fuel mixture in the cylinders. By swirl-enhancing the mixture, all the injected fuel is burnt, thus reducing combustion-generated pollutant emissions. At high engine speed, the air flow section of the intake conduits is maximized to completely fill the cylinders and so generate the maximum possible power.

To vary the air flow section of the intake conduits, each intake conduit has two parallel channels, only one of which can be completely closed by a throttle valve. At low engine speed, the throttle valves are closed to reduce the air flow section of the intake conduits; and, at high engine speed, the throttle valves are opened to maximize the air flow section of the intake conduits.

Various design solutions for swirl system intake manifolds of the type described have been proposed, but comprise a large number of component parts and are complicated to assemble.

SUMMARY OF THE INVENTION

It is an object of the present invention to provide a swirl system intake manifold, for an internal combustion engine, designed to eliminate the aforementioned drawbacks, and which is cheap and easy to produce, has a small number of component parts, and is easy to assemble.

According to the present invention, there is provided a swirl system intake manifold for an internal combustion engine, as claimed in the attached Claims.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
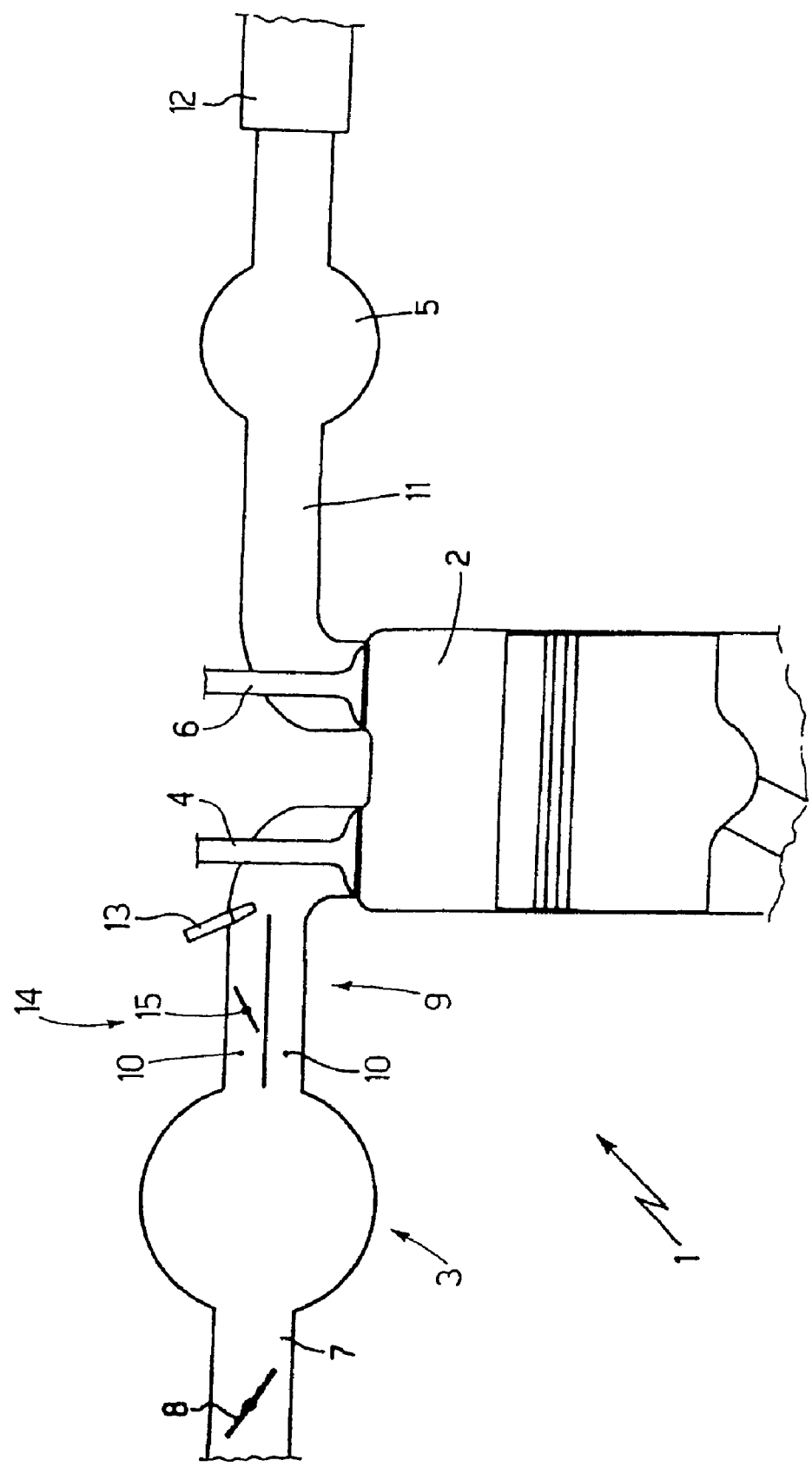
FIG. 1 shows a schematic view of an internal combustion engine featuring an intake manifold in accordance with the present invention.

Number 1 in FIG. 1 indicates as a whole an internal combustion engine having four cylinders 2 (only one shown in FIG. 1), each of which is connected to an intake manifold 3 via two intake valves 4 (only one shown in FIG. 1), and to an exhaust manifold 5 via two exhaust valves 6 (only one shown in FIG. 1).

Intake manifold 3 receives fresh air (i.e. outside air) along a feed conduit 7 regulated by a throttle valve 8, and is connected to cylinders 2 by respective intake conduits 9 (only one shown in FIG. 1), each of which comprises two parallel channels 10 and is regulated by corresponding intake valves 4. Similarly, exhaust manifold 5 is connected to cylinders 2 by respective exhaust conduits 11 (only one shown in FIG. 1), each of which is regulated by corresponding exhaust valves 6; and an exhaust pipe 12, terminating with a known muffler (not shown), extends from exhaust manifold 5 to emit combustion gases into the atmosphere.

In a preferred embodiment, fuel (e.g. petrol, diesel fuel, methane or LPG) is injected into each intake conduit 9 by a respective injector 13 close to corresponding intake valves 4. In an alternative embodiment not shown, injectors 13 are located to inject fuel directly into each cylinder 2.

Intake manifold 3 comprises a swirl system 14 which, as engine 1 is running, varies the cross section of intake conduits 9 as a function of the speed of engine 1. More specifically, swirl system 14 comprises, for each intake conduit 9, a throttle valve 15 mounted along one of the two channels 10 of intake conduit 9 to vary the air flow section of channel 10. More specifically, each throttle valve 15 is movable between a closed position, in which it closes channel 10 completely, and a fully-open position.

Figure 2:
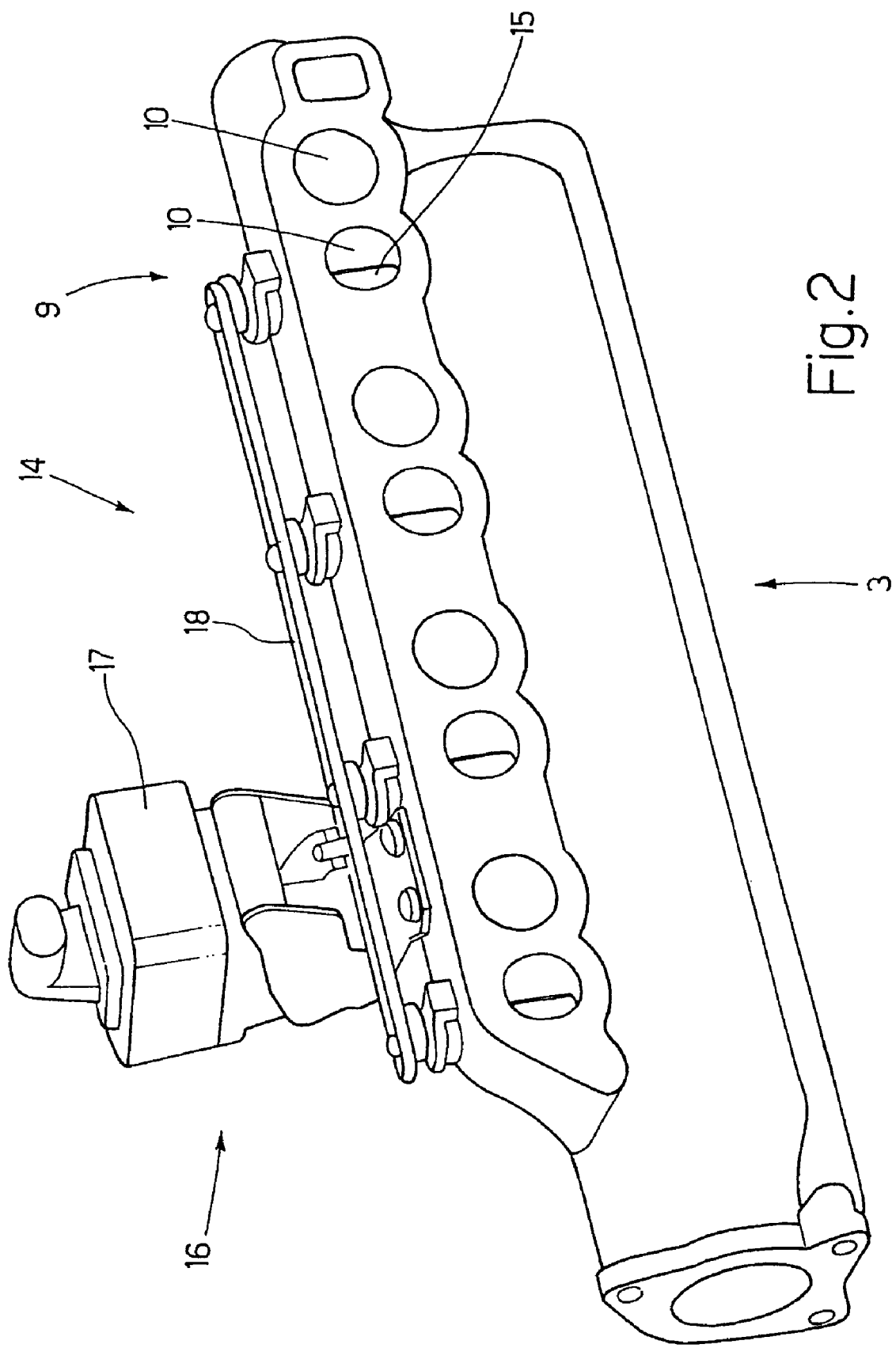
FIG. 2 shows a schematic view in perspective of the FIG. 1 intake manifold.

As shown in FIG. 2, swirl system 14 comprises one electric or pneumatic actuating device 16 for simultaneously and synchronously moving all four throttle valves 15. Actuating device 16 comprises an electric motor 17 (in an alternative embodiment not shown, motor 17 is pneumatic or hydraulic) for moving a bar 18 between two limit positions corresponding to the closed and fully-open positions of throttle valves 15. Bar 18 is connected mechanically to all four throttle valves 15 to move all four simultaneously and synchronously.

Figure 3:
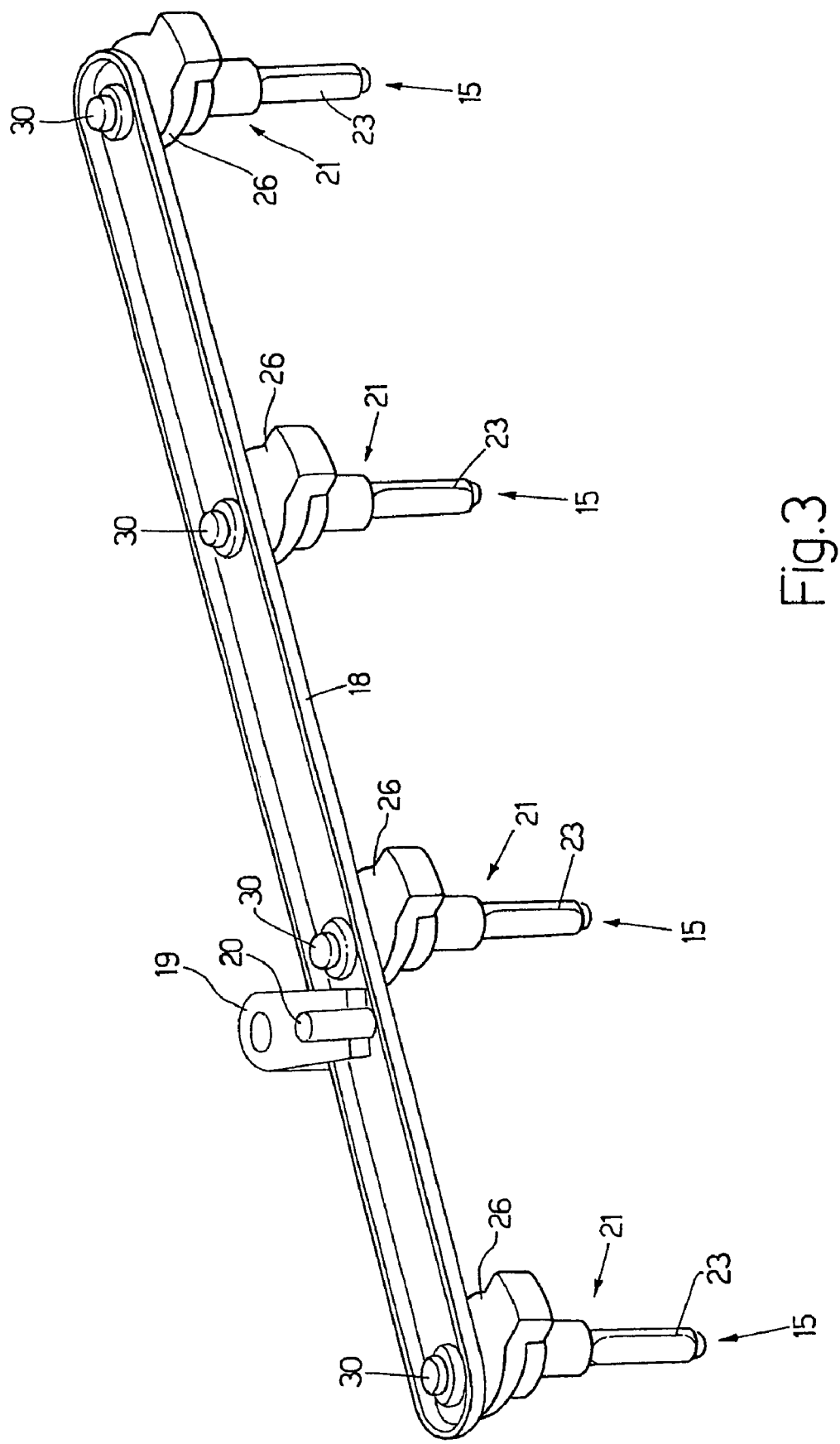
FIG. 3 shows a view in perspective of a group of throttle valves of the FIG. 2 intake manifold.

As shown in FIG. 3, a shaft (not shown) of motor 17 is connected to bar 18 by a fork-shaped connecting member 19, which is fitted on one side to the shaft of motor 17, and on the other side to a pin 20 of bar 18, so as to rotate freely with respect to pin 20.

Figure 4:
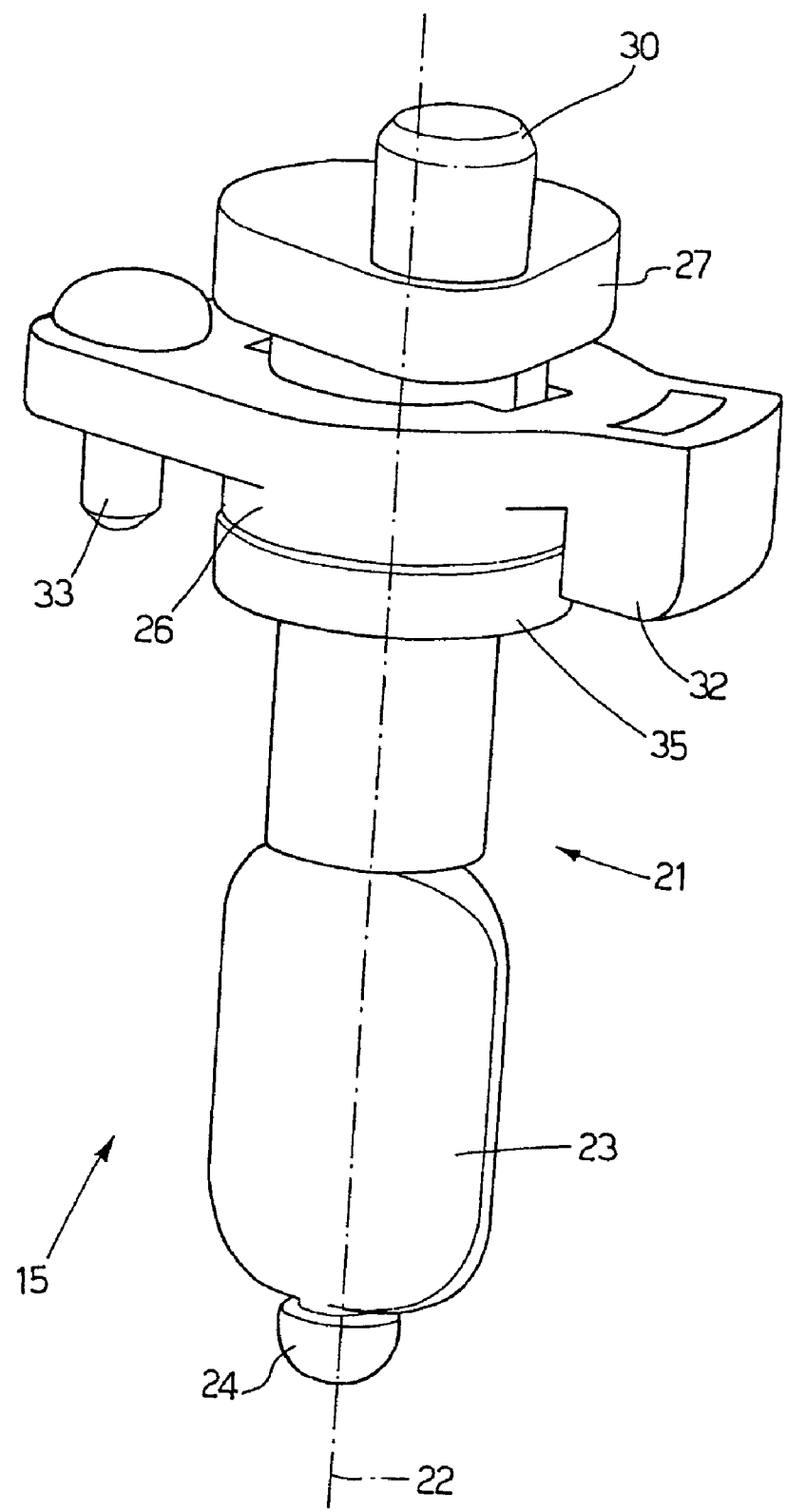
FIG. 4 shows a view in perspective of a FIG. 3 throttle valve.
Figure 5:
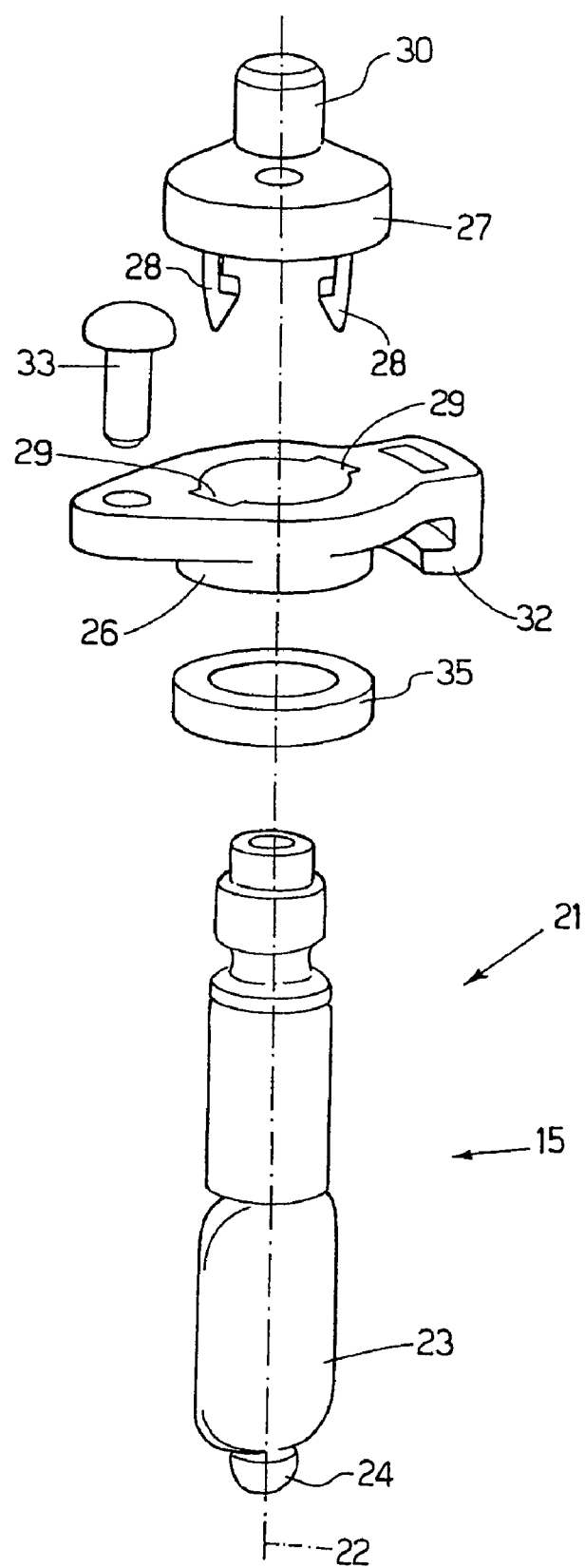
FIG. 5 shows an exploded view in perspective of the FIG. 4 throttle valve.
Figure 6:
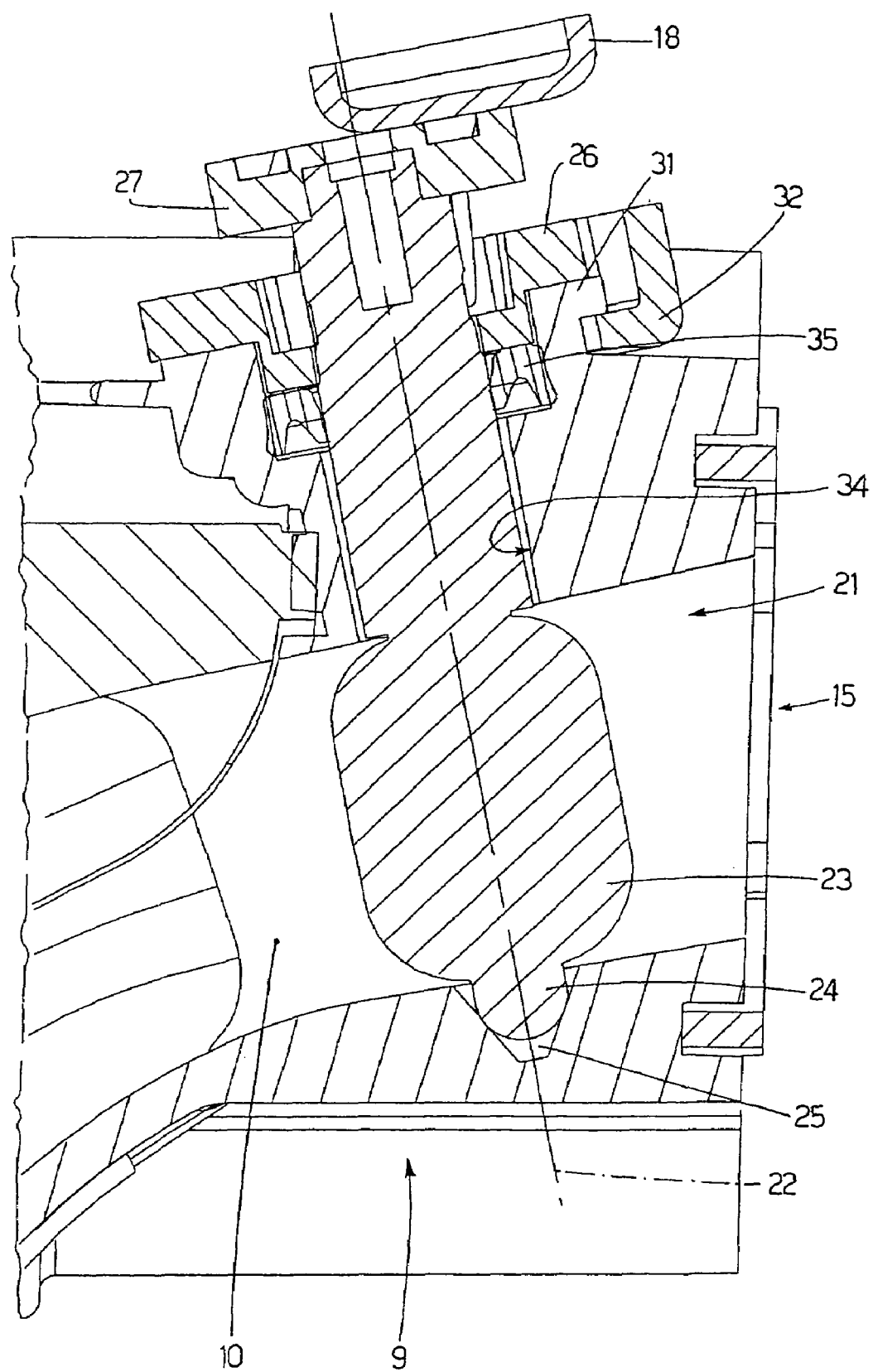
FIG. 6 shows a section of the FIG. 5 throttle valve fitted to the intake manifold.

As shown in FIGS. 4, 5 and 6, each throttle valve 15 comprises a main body 21, which is mounted to rotate about a central axis 22 under the control of actuating device 16, and has a throttle portion 23 or throttle 23 for sealing a channel 10 of an intake conduit 9. More specifically, main body 21 is molded in one piece from plastic material, and acts both as a valve body and supporting shaft. One end 24 of main body 21 is hemispherical for insertion inside a conical seat 25 (FIG. 6) formed along a wall of channel 10 of intake conduit 9. The sphere-cone coupling permits both correct self-centring of main body 21, and rotation of main body 21 with respect to channel 10 and about central axis 22.

Each throttle valve 15 also comprises a fastening flange 26 fitted to main body 21 to rotate with respect to main body 21, and held in position by a fastening member 27 made integral with main body 21 by two press-in lock members 28, which engage respective seats 29 formed on main body 21. Fastening member 27 comprises a connecting pin 30 off-centred with respect to axis of rotation 22, and which connects bar 18 of actuating device 16 mechanically to throttle valve 15 to transmit motion from actuating device 16 to throttle valve 15. Fastening member 27 and main body 21 are connected mechanically to ensure a foolproof angular position of fastening member 27, and therefore of connecting pin 30, with respect to main body 21, and so ensure correct operation of throttle valve 15 by actuating device 16.

Fastening flange 26 is connected to an interface flange 31, formed on the wall of channel 10 housing throttle valve 15, by means of a hook 32, which is jammed inside a respective projection, and by means of a stud 33 pressed inside a respective seat and located on the opposite side to hook 32. Fastening flange 26 is integral with the wall of channel 10, so that, as stated, main body 21 rotates, in use, with respect to fastening flange 26, which mainly serves as a mechanical stop to prevent axial slide of main body 21, i.e. to prevent main body 21 sliding along axis of rotation 22.

As shown in FIG. 6, a seat 34 for main body 21 of throttle valve 15 is formed through the wall of each channel 10 housing a throttle valve 15. The cross section of seat 34 is substantially circular, and comprises two appendixes (not shown), through which throttle portion 23 of main body 21 is fitted to insert main body 21 inside seat 34. The appendixes are so arranged that, in use, throttle portion 23 of main body 21 is never aligned with them.

A lip seal 35 is fitted between main body 21 and seat 34, is held in place and slightly compressed by fastening flange 26, and provides for airtight sealing the inevitable gap, due to manufacturing tolerances, between main body 21 and seat 34. It should be pointed out that lip seal 35 is maintained firmly in the correct position by fastening flange 26, even in the event of overpressure (as is normal in turbosupercharged engines) in channel 10 of the intake conduit.

Swirl system 14 as described above has numerous advantages, by being cheap and easy to produce and assembled quickly. All the component parts (bar 18, main bodies 21, flanges 26, and fastening members 27), in fact, may be molded from plastic material; and each throttle valve 15 may be preassembled outside intake manifold 3 and then inserted inside respective seat 34 in intake manifold 3. More specifically, for each throttle valve 15, main body 21 is preassembled with seal 35, fastening flange 26, and fastening member 27; the preassembled main body 21 is then inserted inside seat 34; and fastening flange 26 is connected mechanically to interface flange 31. It is important to note that, once main body 21 is inserted inside seat 34, and fastening flange 26 connected mechanically to interface flange 31, no further setting or mechanical fastening is required.

The invention claimed is:

1. An intake manifold (3) with a swirl system (14) for an internal combustion engine (1) having a number of cylinders (2); the intake manifold (3) comprises, for each cylinder (2), an intake conduit (9) connecting the intake manifold (3) to the cylinder (2) and in turn comprising two parallel channels (10); the swirl system (14) comprises, for each intake conduit (9), a throttle valve (15) housed inside a channel (10) of the intake conduit (9) to vary the air flow section of the channel (10);

and the intake manifold (3) is characterized in that each throttle valve (15) comprises:
a main body (21) mounted to rotate about a central axis (22) and having a throttle (23) for sealing a channel (10) of an intake conduit (9);
a fastening flange (26) fitted to the main body (21) to rotate with respect to the main body (21), and made integral with an interface flange (31) of the intake manifold (3);
a fastening member (27) made integral with the main body (21) to hold the fastening flange (26) in place, and which is given motion by an actuating device (16); and
a lip seal (35) held in place by the fastening flange (26).

2. An intake manifold (3) as claimed in claim 1, wherein one end (24) of each main body (21) is hemispherical; and a conical seat (25) is formed along a wall of the channel (10) of the intake conduit (9) to house the hemispherical end (24) of the main body (21).

3. An intake manifold (3) as claimed in claim 1, wherein the fastening member (27) is made integral with the main body (21) by means of two press-in lock members (28), which engage respective seats (29) formed on the main body (21).

4. An intake manifold (3) as claimed in claim 1, wherein the fastening flange (26) is connected to the interface flange (31) by means of a hook (32), which is jammed inside a respective projection, and by means of a stud (33) pressed inside a respective seat and located on the opposite side to the hook (32).

5. An intake manifold (3) as claimed in claim 1, wherein the swirl system (14) comprises a single actuating device (16) for simultaneously and synchronously moving all the throttle valves (15).

6. An intake manifold (3) as claimed in claim 5, wherein the actuating device (16) comprises a bar connected mechanically to all the throttle valves (15) to move all the throttle valves (15) simultaneously and synchronously; and a motor (17) for moving the bar (18) between two limit positions corresponding to the closed position and the fully-open position of the throttle valves (15).

7. An intake manifold (3) as claimed in claim 6, wherein the actuating device (16) comprises a fork-shaped connecting member (19) fitted on one side to a shaft of the motor (17), and on the other side to a pin (20) of the bar (18), so as to rotate freely with respect to the pin (20).

8. An intake manifold (3) as claimed in claim 6, wherein each fastening member (27) has a connecting pin (30) off-centred with respect to the axis (22) of rotation, and for mechanically connecting the bar (18) of the actuating device (16) and the throttle valve (15), to transmit motion from the actuating device (16) to the throttle valve (15).

9. An intake manifold (3) as claimed in claim 8, wherein the fastening member (27) and the main body (21) are mechanically connected to establish a foolproof angular position of the fastening member (27), and therefore the connecting pin (30), with respect to the main body (21).

10. An intake manifold (3) as claimed in claim 1, wherein, through the wall of each channel (10) housing a throttle valve (15), a seat (34) is formed for the main body (21) of the throttle valve (15); the cross section of the seat (34) is substantially circular, and comprises two appendixes, through which the throttle (23) of the main body (21) is fitted to insert the main body (21) inside the seat (34).

11. An intake manifold (3) as claimed in claim 10, wherein the appendixes of the seat (34) are so arranged that, in use, the throttle (23) of the main body (21) is never aligned with the appendixes.

* * * * *